United States Patent
McCune, Jr.

(10) Patent No.: US 8,811,533 B2
(45) Date of Patent: Aug. 19, 2014

(54) COMMUNICATIONS TRANSMITTER HAVING HIGH-EFFICIENCY COMBINATION MODULATOR

(76) Inventor: Earl W. McCune, Jr., Santa Clara, CA (US)

( * ) Notice: Subject to any disclaimer, the term of this patent is extended or adjusted under 35 U.S.C. 154(b) by 325 days.

(21) Appl. No.: 13/186,780

(22) Filed: Jul. 20, 2011

(65) Prior Publication Data
US 2013/0022150 A1    Jan. 24, 2013

(51) Int. Cl.
*H04L 27/36* (2006.01)

(52) U.S. Cl.
CPC ............ *H04L 27/361* (2013.01); *H04L 27/362* (2013.01)
USPC ........... 375/298; 375/355; 375/308; 375/295; 375/300; 375/371; 375/297; 375/296; 375/219; 375/340

(58) Field of Classification Search
CPC ..... H04L 27/34; H04L 27/362; H04L 1/0071; H04L 25/03834; H04L 1/0041
USPC ......... 375/298, 302, 296, 297, 300, 308, 355, 375/371; 329/156, 159
See application file for complete search history.

(56) References Cited

U.S. PATENT DOCUMENTS

| | | | |
|---|---|---|---|
| 6,043,707 A | 3/2000 | Budnik | |
| 7,043,213 B2 | 5/2006 | Robinson et al. | |
| 2004/0196923 A1* | 10/2004 | Feher | 375/299 |
| 2007/0019109 A1 | 1/2007 | Lombardi et al. | |
| 2007/0223623 A1* | 9/2007 | Rofougaran | 375/302 |
| 2009/0074106 A1 | 3/2009 | See et al. | |
| 2010/0323639 A1 | 12/2010 | Lozhkin | |
| 2012/0039410 A1 | 2/2012 | Feher | |

OTHER PUBLICATIONS

C-J Li, Hybrid quadrature polar modulator-based transmitter with digital predistorter for simultaneous enhancement of adjacent channel power ratios and power added efficiency (PAE), IET microway. Antennas Propag, 2008, vol. 2 No. 8 pp. 801-812.*
Feb. 13, 2013 Office Action from U.S. Appl. No. 13/186,756.
Office Action and Notice of References Cited from U.S. Appl. No. 13/186,793.

* cited by examiner

*Primary Examiner* — Dhaval Patel
(74) *Attorney, Agent, or Firm* — Patent Law Professionals, P.C.; William E. Winters

(57) ABSTRACT

A communications transmitter includes a combination modulator and a baseband processor configured to generate amplitude, angle, in-phase and quadrature signals. The combination modulator is configured to modulate in the quadrature domain or the polar domain, depending on an output power level of the transmitter and/or the type of modulation scheme being used. When configured to modulate in the quadrature domain, the baseband processor is configured to generate time-varying in-phase and quadrature modulating signals and time-invariant amplitude and angle signals for the combination modulator. When configured to modulate in the polar domain, the baseband processor is configured to generate time-varying amplitude and angle modulating signals and time-invariant in-phase and quadrature signals for the combination modulator. In another embodiment of the invention, the communications transmitter is configurable to operate in three different operational modes: linear, envelope tracking and switch modes. Which operational mode the communications transmitter is configured to transmit depends on the type of modulation scheme being used and/or the transmitter output power level.

20 Claims, 8 Drawing Sheets

| OUTPUT POWER LEVEL | MODULATOR MODE | I | Q | A | θ |
|---|---|---|---|---|---|
| LOW | Quadrature | I(t) | Q(t) | $A_0$ | $\theta_0$ |
| HIGH | Polar | $I_0$ | $Q_0$ | A(t) | θ(t) |

| | MODULATOR MODE | |
|---|---|---|
| | POLAR | QUADRATURE |
| MODULATION SCHEME | Bluetooth 1.0, 1.2 | Bluetooth EDR |
| | GSM, EDGE | WCDMA, HSPA, LTE |

| MODULATION SCHEME | OPERATING MODE | I | Q | A | θ |
|---|---|---|---|---|---|
| Type I | Linear | I(t) | Q(t) | $A_0$ | $\theta_0$ |
| Type II | ET | I(t) | Q(t) | A(t) | $\theta_0$ |
| Type III | Switch | $I_0$ | $Q_0$ | A(t) | θ(t) |

| OUTPUT POWER LEVEL | OPERATING MODE | $I$ | $Q$ | $A$ | $\theta$ |
|---|---|---|---|---|---|
| LOW | Linear | $I(t)$ | $Q(t)$ | $A_0$ | $\theta_0$ |
| MEDIUM | ET | $I(t)$ | $Q(t)$ | $A(t)$ | $\theta_0$ |
| HIGH | Switch | $I_0$ | $Q_0$ | $A(t)$ | $\theta(t)$ |

COMMUNICATIONS TRANSMITTER HAVING HIGH-EFFICIENCY COMBINATION MODULATOR

FIELD OF THE INVENTION

The present invention relates in general to communications transmitters. More particularly, the present invention relates to modulators and modulation methods for communications transmitters.

BACKGROUND OF THE INVENTION

In digital communications transmitters, a modulator is employed to modulate the amplitude, phase and/or frequency of a carrier signal capable, of being transmitted over a communications medium (e.g., air, space, wire, cable, fiber optics) to a remote receiver. How the modulator modulates the carrier signal depends on the type of modulation scheme that is used. In some communications systems, simple modulation schemes like frequency-shift keying (FSK) or phase-shift keying (PSK) are used and the modulator need only modulate the phase or frequency of the carrier signal. With those types of modulation schemes, the resulting modulated carrier signal has constant amplitude, i.e., has a constant "envelope."

In an effort to increase spectral efficiency, many communications systems such as, for example, Bluetooth EDR (extended data rate), Wi-Fi, WiMAX (Worldwide interoperability for Microwave Access), EDGE (Enhanced Data rates for GSM Evolution), W-CDMA (Wideband Code Division Multiple Access), and Long-Term Evolution (LTE), require modulators that operate according to complex modulation schemes in which both the amplitude and angle of the carrier signal are modulated. When these "non-constant envelope" modulation schemes are used in conventional quadrature-modulator-based transmitters, output power back-off (OBO) must be applied to prevent signal distortion. OBO prevents signal distortion by ensuring that the power amplifier (PA) of the quadrature-modulator-based transmitter operates in its linear region of operation for the full dynamic range of output powers the transmitter must be configurable to transmit. Unfortunately, linear PAs are not very energy efficient and OBO consequently results in a sacrifice of energy efficiency for linearity.

One way of avoiding the linearity versus efficiency tradeoff is to use a polar modulation transmitter, rather than a quadrature-modulator-based transmitter. In a polar modulation transmitter, modulation is performed in the polar domain using separate amplitude modulating and angle modulating signals. The angle modulating signal has a constant amplitude and is used to generate a constant-envelope phase-modulated carrier signal. The constant-envelope phase-modulated carrier signal is coupled to the signal input of the polar modulation transmitter's PA. Because it has a constant envelope, OBO is not required and the PA can be configured to operate as an energy-efficient nonlinear PA without the risk of signal peak clipping. Typically, the PA is implemented as a switch-mode PA, which consumes most of its power only during times when it is switching. As the phase-modulated carrier signal is applied to the signal input of the PA, the amplitude modulating signal containing the signal envelope is applied to the power supply port of the PA. When configured in this manner, the switch-mode PA effectively operates as a modulator, modulating the phase-modulated carrier signal by the amplitude information in the amplitude-modulated power supply signal to produce the desired non-constant envelope carrier signal at its output.

Although the polar modulation transmitter is more energy efficient than the quadrature-modulator-based transmitter, it does have its own limitations. One limitation relates to a phenomenon known as "bandwidth expansion." Some modulation schemes produce signals having signal trajectories that pass through or very close to the origin in the complex signal plane. When converted to and processed in the polar domain, these types of signal trajectories have abrupt changes in phase. In fact, for signal trajectories that pass directly through the origin, an instantaneous phase change of 180° occurs. Abrupt phase changes correspond to high-frequency events in the polar domain and are highly undesirable since they can exceed the tuning bandwidth capability of the phase modulator used to generate the phase-modulated carrier signal.

Another limitation of the polar modulation transmitter is that at low output power levels the PA can become incapable of operating as a switch. To what extent this is a problem depends on the modulation scheme being used and on noise limitation and modulation requirements of the controlling communications standard. In general, modulation schemes that produce amplitude modulating signals having low magnitudes tend to be the most problematic.

It would be desirable, therefore, to have modulator methods and apparatus that combine the best attributes of quadrature-modulator-based and polar modulation transmitters yet avoid their various drawbacks and limitations.

BRIEF SUMMARY OF THE INVENTION

Methods and apparatus for modulating signals are disclosed. An exemplary communications transmitter comprises a baseband processor, a combination modulator and an amplifier having one or more stages. The baseband processor is configured to generate amplitude, angle, in-phase and quadrature signals A, $\theta$, I and Q. The combination modulator is configured to modulate in the quadrature domain or the polar domain, depending on an output power level of the transmitter and/or the type of modulation scheme used. When modulating in the quadrature domain, the baseband processor is configured to generate time-varying in-phase and quadrature modulating signals I(t) and Q(t) and time-invariant amplitude and angle signals (i.e., constants) $A_0$ and $\theta_0$ for the combination modulator, and the final stage of the amplifier is configured to operate in it linear region of operation. When modulating in the polar domain, the baseband processor is configured to generate time-varying amplitude and angle modulating signals A(t) and $\theta(t)$ and time-invariant in-phase and quadrature signals $I_0$ and $Q_0$ for the combination modulator, and the final stage of the amplifier is configured to operate as a switch-mode amplifier.

In another embodiment of the invention, the baseband modulator, combination modulator and output stage amplifier of the transmitter are configurable so that the output stage amplifier operates in one of three different operating modes: linear mode, envelope tracking (ET) mode, and switch mode. Which of the three operating modes the combination modulator is configured to operate is made to depend on characteristics of the modulation scheme being employed and/or the output power level of the transmitter.

Further features and advantages of the invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
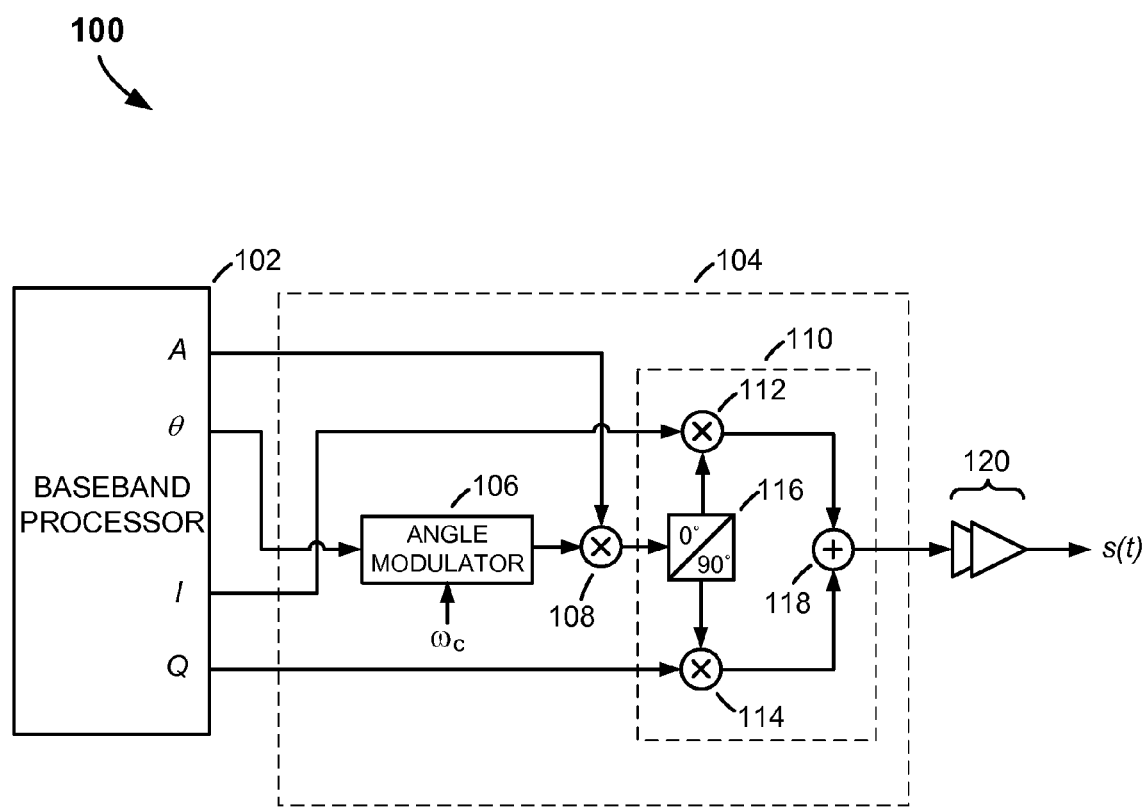
FIG. 1 is a drawing of a communications transmitter, according to an embodiment of the present invention.

Referring to FIG. 1, there is shown an exemplary communications transmitter 100, according to an embodiment of the present invention. The communications transmitter 100 comprises a baseband processor 102, a combination modulator 104, and an amplifier 120 having one or more amplifier stages. The baseband processor 102 comprises hardware or a combination of hardware and software, and is configured to generate amplitude, angle, in-phase and quadrature signals A, $\theta$, I and Q for the combination modulator 104. In various embodiments of the invention, the amplitude, angle, in-phase and quadrature signals A, $\theta$, I and Q comprise amplitude, angle, in-phase and quadrature components of a modulating signal. Depending on the actual design implementation, the amplitude, angle, in-phase and quadrature signals A, $\theta$, I and Q may comprise analog signals, digital signals, or a combination of analog and digital signals.

The combination modulator 104 comprises an angle modulator 106; a multiplier 108; and a quadrature modulator 110 that includes an in-phase mixer 112, a quadrature mixer 114, a quadrature phase splitter 116, and a combiner 118. The angle modulator 106 is implemented as a frequency modulator or a phase modulator, depending on the application. When a phase modulator is used, a phase modulating signal $\theta=\theta(t)$ generated by the baseband processor 102 is directed to the input of the angle modulator 106 and used to modulate a carrier signal of frequency $\omega_c$. When configured as a frequency modulator, a frequency modulating signal (e.g., $d\theta(t)/dt$) provided by the baseband processor 102 is used to modulate the carrier signal.

As explained in more detail below, the combination modulator 104 may be configured to modulate in the quadrature domain, the polar domain, or in the polar and quadrature domains at the same time. When configured to modulate in the polar domain, the angle modulator 106 generates an angle-modulated carrier signal. When configured to modulate in the quadrature domain, the baseband processor 102 sets the angle signal $\theta$ to a constant value $\theta_0$, in which case the angle modulator 106 performs no modulation function but, instead, serves primarily as the LO for the quadrature modulator 110, specifically, providing an unmodulated carrier signal to the quadrature phase splitter 116 of the quadrature modulator 110.

The multiplier 108 operates as an amplitude modulator in applications where the amplitude signal A provided by the baseband processor 102 is a time-varying amplitude modulating signal A(t). Alternatively, when the baseband processor 102 sets the amplitude signal A to a constant value $A_0$, the multiplier 108 serves as a simple multiplier, which merely scales the carrier signal produced at the output of the angle modulator 106 by the constant $A_0$.

Amplitude and/or phase modulation may also or alternatively be performed by the quadrature modulator 110. The carrier signal, whether angle and/or amplitude modulated by the angle modulator 106 and multiplier 108, serves as the LO for the quadrature modulator 110 and is applied to the input of the quadrature phase splitter 116. The quadrature phase splitter 116 passes the previously modulated or unmodulated carrier signal to the in-phase mixer 112 and also generates and directs a ninety-degree phase shifted version of the carrier signal to the quadrature mixer 114. The magnitude of the modulated carrier signal produced at that output of the combiner 118 is proportional to $(I^2+Q^2)^{1/2}$. Accordingly, when the I and Q signals provided by the baseband processor 102 comprise time-varying in-phase and quadrature modulating signals I(t) and Q(t), the quadrature modulator 110 operates to amplitude modulate the un-rotated and rotated versions of the carrier signal applied to the in-phase and quadrature mixers 112 and 114. The in-phase and quadrature amplitude modulated signals are combined by the combiner 118 to produce the final, desired amplitude-modulated signal. The quadrature modulator 110 also serves as an angle modulator when the ratio of I and Q varies over time, since the phase of the carrier signal at the output of the quadrature modulator 110 is proportional to $\tan^{-1}(Q/I)$. Accordingly, the quadrature modulator 110 may be configured to perform both amplitude and angle modulation independent of the angle modulator 106 and multiplier 108.

Figure 2:
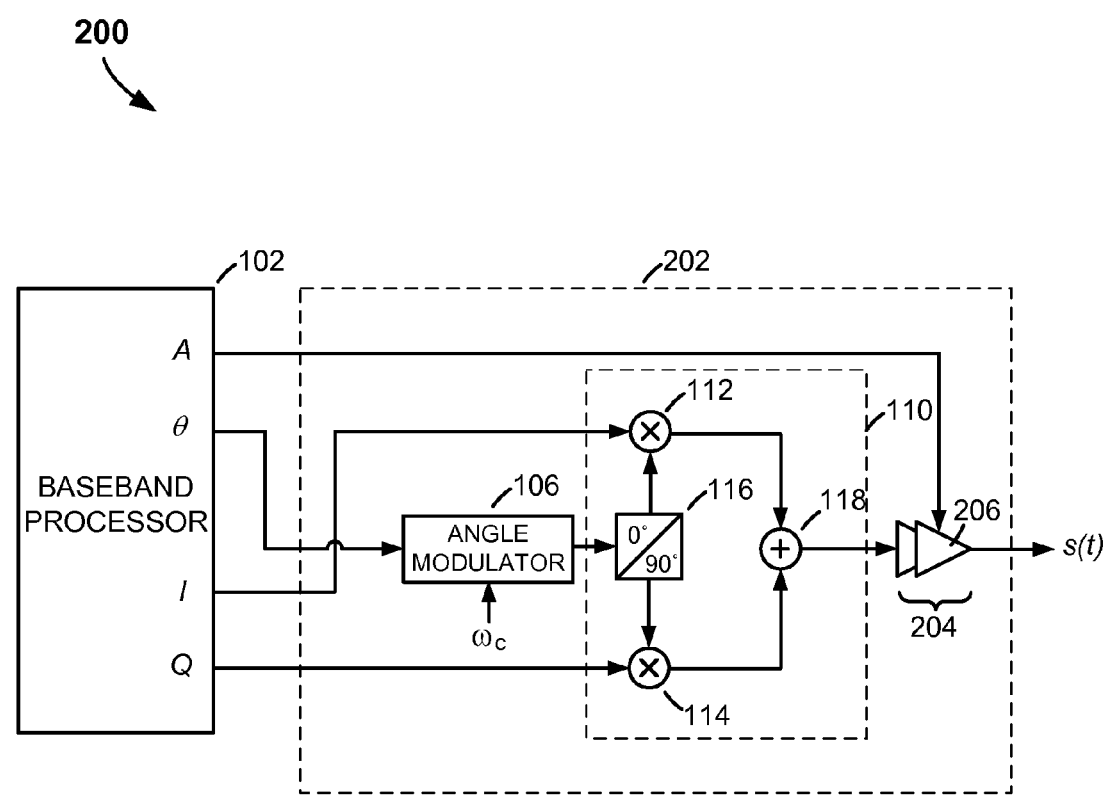
FIG. 2 is a drawing of a communications transmitter, according to another embodiment of the invention.

The in-phase and quadrature mixers 112 and 114 of the quadrature modulator 110 may be implemented as four-quadrant multipliers (e.g., using Gilbert cells) or as switch-based multipliers. In the latter implementation, the switch-based multipliers may be susceptible to rejecting amplitude modulation contained in the un-rotated and rotated carrier signals produced by the quadrature phase splitter 116. To avoid this problem, amplitude modulation or magnitude control may be alternatively performed at the output of the quadrature modulator 110, rather than before it. This alternative approach is illustrated in FIG. 2, which is a drawing of a communications transmitter 200, according to another embodiment of the present invention. The communications transmitter 200 comprises a baseband modulator 102, like or similar to that used in the communications transmitter 100 in FIG. 1, and a combination modulator 202. The combination modulator 202 incorporates at least one amplifier stage 206 (e.g., an output power amplifier (PA) stage) of a multi-stage amplifier 204. The output stage PA 206 is configured to perform an amplitude modulation function when the combination modulator 104 is modulating in the polar domain. Like the combination modulator 104 of the communications transmitter 100 in FIG. 1, the combination modulator 202 is capable of performing amplitude modulation independent of the quadrature modulator 110. However, it also avoids the amplitude modulation rejection problem associated with using switch-based mixers 112 and 114.

Figure 3:
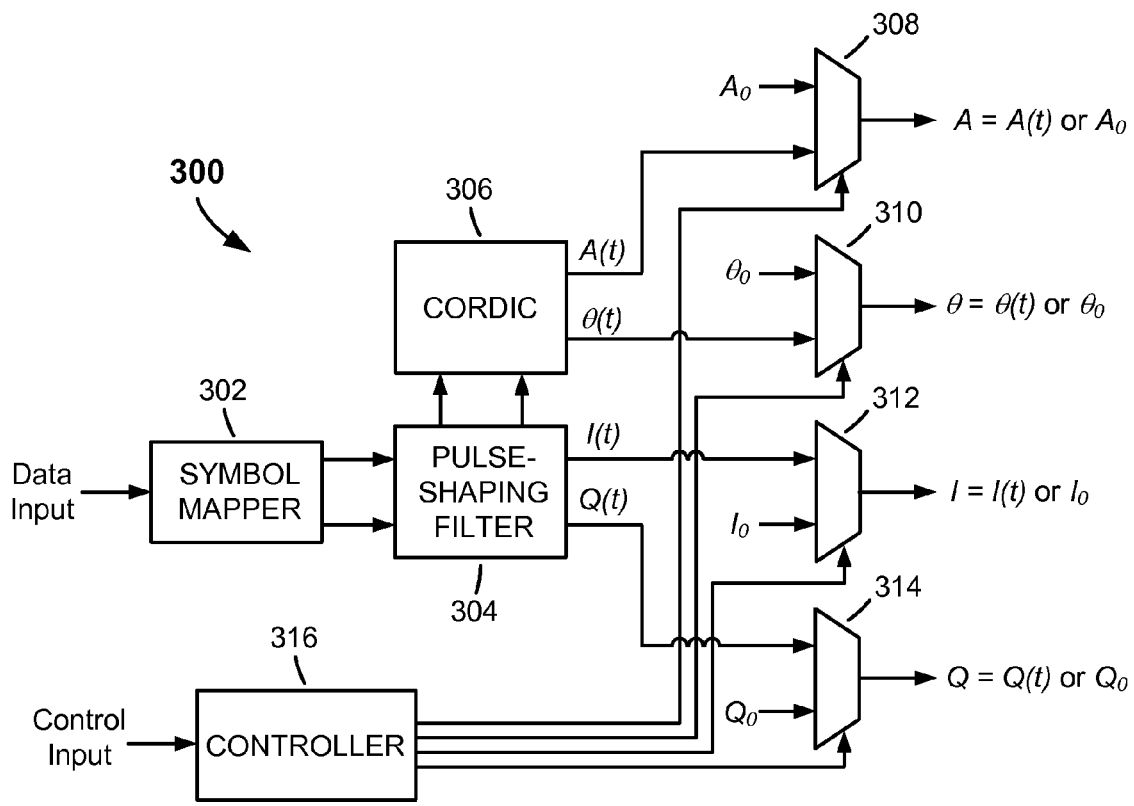
FIG. 3 is a drawing depicting the functional elements of the baseband processor used in the communications transmitters in FIGS. 2 and 3.

FIG. 3 is a drawing depicting the functional elements 300 of the baseband processor 102. In general, the functional elements 300 may be configured so that each of the amplitude, angle, in-phase and quadrature signals A, θ, I and Q may be independently set to either a time-invariant signal $A_0$, $\theta_0$, $I_0$ and $Q_0$ (i.e., a constant) or a time-varying modulating signal A(t), θ(t), I(t) and Q(t). The functional elements 300 include a symbol mapper 302, a pulse-shaping, filter 304, a rectangular-to-polar converter 306, which may be implemented using a Coordinate Rotation Digital Computer (CORDIC) converter as shown, multiplexers 308, 310, 312 and 314, and a controller 316. Each, some or all of the functional elements 300 may be implemented in hardware or a combination of hardware and software. In one embodiment of the invention, for example, the functional elements 300 are implemented using a digital signal processor, such as a microprocessor or microcontroller configured to execute a computer program containing instructions for generating the amplitude, angle, in-phase and quadrature signals A, θ, I and Q. In other embodiments of the invention, some or all of the functional elements 300 are implemented in configurable logic elements of a programmable logic circuit, such as a field-programmable gate array, or in specially designed logic of an application specific integrated circuit. For the purpose of this disclosure, the meaning of the term "baseband processor" includes all of these various implementations.

The symbol mapper 302 is configured to map data bits in a digital message to be transmitted into in-phase and quadrature sequences of symbols, according to a predetermined modulation scheme. The pulse-shaping filter 304 operates on the in-phase and quadrature sequences of symbols to produce the desired band-limited in-phase and quadrature modulating signals I(t) and Q(t). The rectangular-to-polar converter 306, which may be implemented using a CORDIC converter, as shown in the drawing, is configured to convert the rectangular-coordinate in-phase and quadrature modulating signals I(t) and Q(t) to polar domain amplitude and phase modulating signals A(t) and θ(t). Alternatively, the symbol mapper 302, in addition to generating the in-phase and quadrature modulating signals I(t) and Q(t), is also configured to generate the polar domain amplitude and phase modulating signals A(t) and θ(t) directly, i.e., without having to apply a subsequent rectangular-to-polar conversion process.

The controller 316 is configured to generate select signals for the multiplexers 308, 310, 312 and 314, in response to a control input signal. In general, the controller 316 may be programmed or configured to independently control each of the multiplexers 308, 310, 312 and 314. Accordingly, depending on how the controller 316 is programmed or configured, each of the amplitude, angle, in-phase and quadrature signals A, θ, I and Q produced at the output of the baseband processor 102 may be a constant $A_0$, $\theta_0$, $I_0$, $Q_0$ or a time-varying signal A(t), θ(t), I(t), Q(t). It should be noted that, alternatively, the symbol mapper 302 may be configured to generate the constants $A_0$, $\theta_0$, $I_0$, $Q_0$ itself, in addition to the time-varying modulating signal A(t), θ(t), I(t) or Q(t)), thereby effectively subsuming the multiplexing functions in the symbol mapper 302 and obviating the need for output multiplexers 308, 310, 312 and 214. In one embodiment of the invention, the amplitude, angle, in-phase and quadrature signals A, θ, I and Q are continuously active and always applied to the combination modulator 104, the only change over time being whether the A, θ, I and Q signals are constants $A_0$, $\theta_0$, $I_0$, $Q_0$ or time-varying signal A(t), θ(t), I(t), Q(t).

Figure 4:
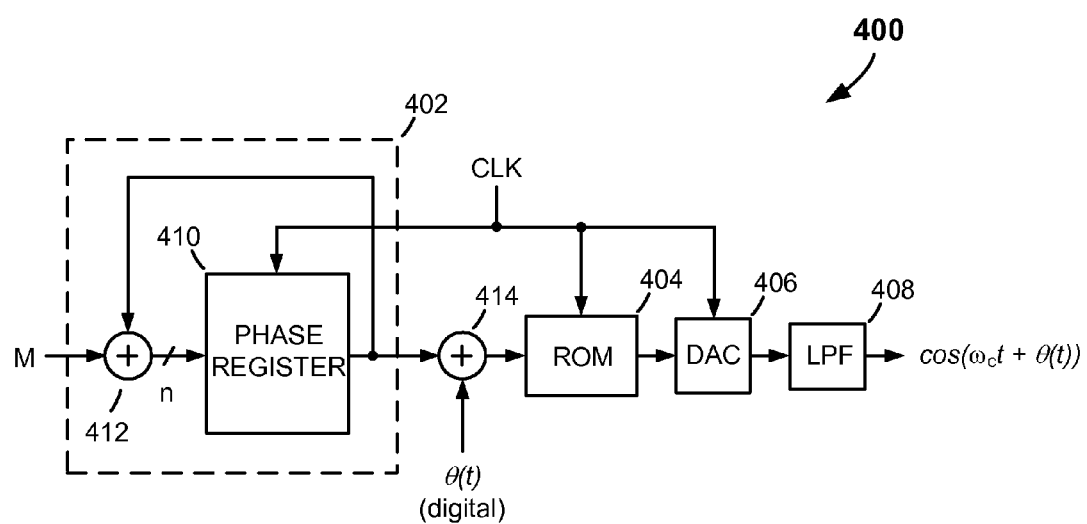
FIG. 4 is a drawing of one type of phase modulator that may be used to implement the angle modulators of the combination modulators of the communications transmitters in FIGS. 2 and 3.

As explained above, depending on the application, the angle modulator 106 of the combination modulator 202 comprises a frequency or phase modulator. FIG. 4 is a drawing of one type of phase modulator 400 that may be used in applications in which a phase modulator is needed or required. The exemplary phase modulator 400 comprises a direct digital synthesis (DDS) phase modulator having an n-bit phase accumulator 402, a read-only memory (ROM) 404, a digital-to-analog converter (DAC) 406, and a low-pass filter (LPF) 408. The phase accumulator 402 is configured to update (i.e., accumulate) on each cycle of a clock (CLK) and store thereupon an n-bit number in its phase register 410. Also on each cycle of the CLK, the prior value of the n-bit number stored in the phase register 410 is added to a digital multiplier M, via a summer 412. The digital multiplier M is determinative of the output frequency (i.e., carrier frequency $f_c = \omega_c/2\pi$) of the phase modulator 400. For example, when M=0 . . . 01, the phase accumulator 402 accumulates for $2^n$ cycles of the CLK, then overflows and restarts, and the output frequency is equal to $\omega_c = 2\pi f_{CLK}/2^n$. When M is greater than 0 . . . 01, the phase accumulator 402 rolls over M times as fast and the output frequency is equal to $\omega_c = M\pi f_{CLK}/2^n$.

Digital phase modulation θ(t) provided by the baseband processor 102 is introduced via a combiner 414, which is disposed between the output of the phase accumulator 402 and the input of the ROM 404. The resulting digital phase-modulated signal at the output of the combiner 414 serves as an address to a cosine lookup table (LUT) stored in the ROM 404. Each addressable entry in the LUT maps to a phase point on a cosine wave from 0 to $2\pi$ radians (i.e., 0° to 360°). Therefore, the cosine LUT serves as a phase-to-amplitude converter, directly mapping the phase information in the digital phase-modulated signal into a sequence of digital amplitude words. The digital amplitude words may then be converted to an analog waveform by the DAC 406, if the design dictates, and low-pass filtered by the LPF 408 to produce the final desired phase-modulated waveform $\cos(\omega_c t+\theta(t))$.

Other types of modulators may be used to implement the angle modulator 106. For example, a delay-based modulator or a phase-locked loop based modulator may be alternatively employed. Further details concerning these and other types of phase and frequency modulators and further details concerning DDS and modulated DDS may be found in U.S. Pat. No. 4,746,880 to McCune and E. McCune, *Practical Wireless Digital Signals*, Cambridge University Press, 2010 (ISBN 978-0-521-51630-3 Hardback), both of which are hereby incorporated by reference in their entireties and for all purposes.

Figures 5, 6:
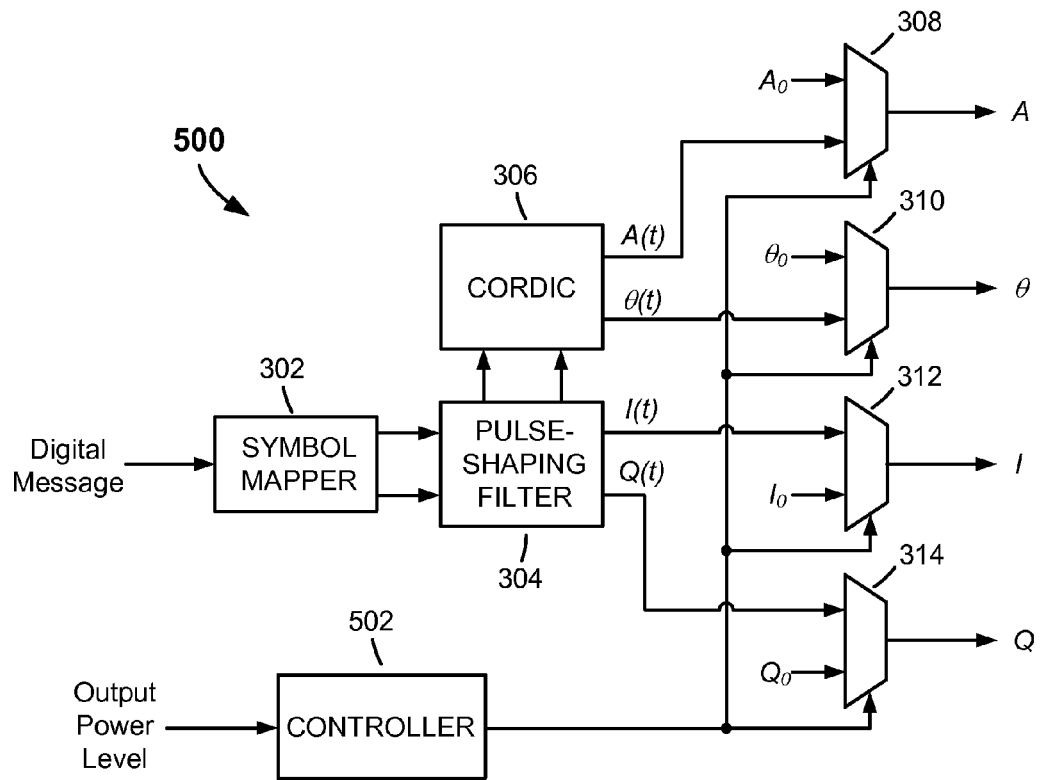
FIG. 5 is a drawing depicting the functional elements of the baseband processor of the communications transmitter in FIG. 2 for an embodiment of the invention in which the combination modulator is configurable to modulate in the quadrature and polar domains.
FIG. 6 is a table showing the settings (time-varying or time-invariant) of the in-phase, quadrature, amplitude and angle signals generated by the baseband processor of the communications transmitter in FIG. 2 in the embodiment of the invention in which the combination modulator is configurable to modulate in the quadrature and polar domains.

According to one embodiment of the invention, the combination modulator 202 of the communications transmitter 200 in FIG. 2 is configured to perform quadrature modulation at low output power levels and is configured to perform polar modulation at high output powers. What defines the boundary between low and high output power levels is set during design depending on the particular modulation scheme being used, signal characteristics of the modulated signals, capabilities of the amplifiers making up the multi-stage amplifier 204, specifications of a controlling standard, and/or other factors. FIG. 5 is a drawing depicting the functional elements 500 of the baseband processor 102 when configured according to this embodiment of the invention. Similar to as described above, the symbol mapper 302 and pulse-shaping filter 304 work to generate in-phase and quadrature modulating signals I(t) and Q(t), and the CORDIC converter 306 generates amplitude and phase modulating signals A(t) and θ(t) from the in-phase and quadrature modulating signals I(t) and Q(t). A controller 502 is configured to operate according to the table in FIG. 6 and generate selects signals for the multiplexers 308, 310, 312 and 314 in response to an output power level control signal.

When the communications transmitter 200 is operating at LOW output power levels, amplitude and angle constants $A_0$ and $\theta_0$ are produced at the A and θ outputs of the baseband processor 102 while in-phase and quadrature modulating signals I(t) and Q(t) are produced at the I and Q outputs. Hence, the combination modulator 202 performs amplitude and/or angle modulation in the quadrature domain. In other words, the combination modulator 202 is configured in what may be referred to as "quadrature mode." The amplitude constant $A_0$ is coupled to the input of the angle modulator 106 while the angle constant $\theta_0$ is coupled to the power supply port of the amplifier stage 206 of the multi-stage amplifier 204. Because the amplitude and angle signals A and θ are constants (i.e., are set to $A_0$ and $\theta_0$), the output of the angle modulator 106 is unmodulated. The unmodulated carrier signal serves as the LO for the quadrature modulator 110 and is applied to the input of the quadrature phase splitter 116 of the quadrature modulator 110. For circumstances in which a non-constant envelope modulation scheme is used and the combination modulator 202 is configured in quadrature mode, amplitude and/or angle modulation is performed by the quadrature modulator 110 according to time variations in the amplitude of the in-phase and quadrature modulating signals I(t) and Q(t), and the output stage amplifier of the multi-stage amplifier 204 is configured to operate in its linear region of operation (e.g., as a Class A, B or AB amplifier).

Conversely, when the communications transmitter 300 is operating at HIGH output power levels, the baseband processor 102 is configured to produce time-varying amplitude and angle (phase or frequency) modulating signals A(t) and θ(t) or dθ(t)/dt at the A and θ outputs and time-invariant in-phase and quadrature signals $I_0$ and $Q_0$ at the I and Q outputs. Under this configuration, the combination modulator 202 operates in what may be referred to as "polar mode." The angle modulating signal θ(t) is coupled to the input of the angle modulator 106 and the amplitude modulating signal A(t) is used to modulate the power supply applied to the power supply port of the amplifier stage 206 of the multi-stage amplifier 204. With the in-phase and quadrature signals I and Q set to constants $I_0$ and $Q_0$, the quadrature modulator 110 performs no modulation function. Instead, any angle modulation is performed by the angle modulator 106, in response to the angle modulating signal θ(t), and any amplitude modulation is performed by modulating the power supply applied to the power supply port of the amplifier stage 206 using the amplitude modulating signal A(t), e.g., with the possible aid of a Class-S modulator or agile linear regulator (not shown) configured between the baseband processor 102 and the power supply port of the amplifier stage 206. Finally, when operating in polar mode, the output stage 206 of the multi-stage amplifier 204 is configured as an energy-efficient nonlinear power amplifier (PA), such as, for example, a Class D or Class E switch-mode PA.

The exemplary embodiment of the invention described above demonstrates how the combination modulator 202 of the communication transmitter 200 is configured to operate in either quadrature mode or polar mode. In some applications it may be beneficial to operate the combination modulator 202 in both modes at the same time. This mode of operation may be referred to as "hybrid" mode. In hybrid mode, instead of holding either the amplitude and angle signals A and θ constant or in-phase and quadrature signals I and Q constant, the baseband processor 102 is configured so that three or all of the amplitude, angle, in-phase and quadrature signals A, θ, I and Q provided to the combination modulator 202 are time-varying signals.

Figures 7, 8:
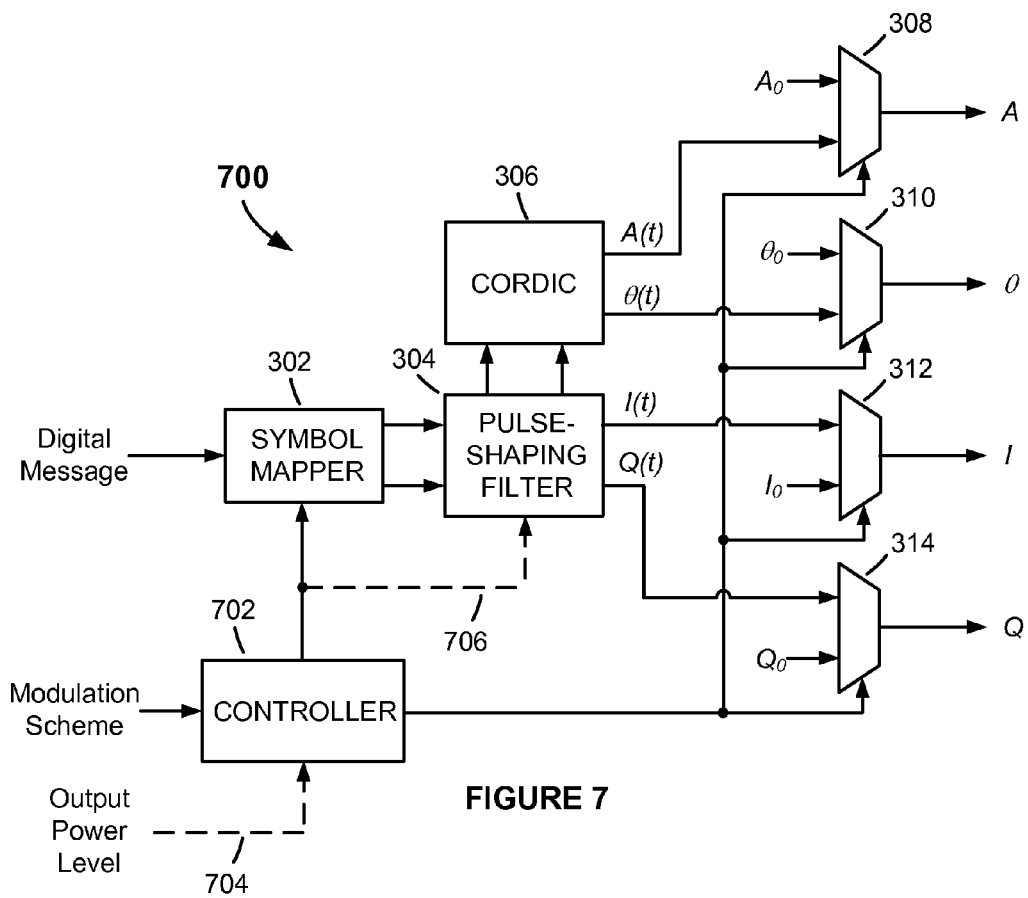
FIG. 7 is a drawing depicting the functional elements of the baseband processor of the communications transmitter in FIG. 2 for another embodiment of the invention in which the combination modulator is configurable to modulate in the quadrature and polar domains.
FIG. 8 is a table illustrating which modulator mode (polar or quadrature) the controller of the baseband processor of the communications transmitter in FIG. 2 may direct the combination modulator to operate, depending on various modulation schemes used in Bluetooth and cellular communications technologies.

According to another embodiment of the invention, the communications transmitter 200 is configured to operate according to different modulation schemes. FIG. 7 is a drawing depicting the functional elements 700 of the baseband processor 102 when configured according to this embodiment of the invention. The symbol mapper 302 operates similar to as described above, except that it is configurable to generate the amplitude, angle, in-phase and quadrature signals A, θ, I and Q according to different modulation schemes. Which modulation scheme the symbol mapper 302 is configured to use and which modulator mode (polar or quadrature mode) the combination modulator 202 operates is determined by a controller 702, in response to a modulation scheme select signal. The selected modulator mode may also be made to depend on the output power level of the communications transmitter 200, as indicated by the dashed line 704 directing an output power level signal to the controller 702. Depending on the selected modulation scheme or communications system in which the communications transmitter 200 is used, the type of pulse-shaping filter 304 employed may also be changed as indicated by the second dashed line 706.

In general, the controller 702 is configured so that the combination modulator 202 operates in quadrature mode (A=$A_0$, θ=$\theta_0$, I=I(t), Q=Q(t)) for modulation schemes that produce signals having low magnitudes or high peak-to-minimum dynamic ranges (e.g., a high peak-to-minimum power ratios (PMPRs) for a given output power), and is configured so that the combination modulator 202 operates in polar mode (A=A(t), θ=θ(t), I=$I_0$, Q=$Q_0$) for modulation schemes that produce signals having a relatively higher peak magnitudes or lower peak-to-minimum dynamic ranges. However, other factors, including output power level, may also or alternatively be used by the controller 702 in determining whether the combination modulator 202 operates in polar mode or quadrature mode.

FIG. 8 is a table illustrating which modulator mode (polar or quadrature) the controller 702 may direct the combination modulator 202 to operate for the various modulation schemes used in Bluetooth and cellular communications technologies. To support early and later versions of the Bluetooth standard, for example, the controller 702 is configured so that the combination modulator 202 operates in polar mode for Bluetooth versions 1.0 or 1.2, which employ the GFSK (Gaussian Frequency Shift Keying) modulation scheme, and is configured so that the combination modulator 202 operates in quadrature mode for Bluetooth EDR (extended data rate) versions 2.0 or 2.1, which employ π/4 DQPSK (Differential Quadrature Phase Shift Keying) and 8 DPSK (Eight Phase Differential Phase Shift Keying), respectively. The π/4 DQPSK and 8 DPSK modulation schemes both produce signals having much higher PMPRs than signals produced from GMSK. Therefore, by operating the combination modulator 202 in quadrature mode for Bluetooth 1.0 and 1.2, bandwidth expansion problems associated with performing modulation in the polar domain are avoided. On the other hand, because GFSK has a much lower PMPR, operating the combination modulator 202 in polar mode for Bluetooth EDR 2.0 and 2.1 communications links allows energy efficiency to be maximized.

Similar benefits may be realized in cellular applications. For example, to support the modulation schemes used in GSM (Global System for Mobile Communications) and EDGE (Enhanced Data Rates for GSM Evolution), the controller 702 may be configured so that the combination modulator 202 operates in polar mode, and alternatively configured so that the combination modulator 202 operates in quadrature mode for WCDMA (Wideband Code Division Multiple Access), HSPA (High-Speed Packet Access) or LTE (Long Term Evolution). When in polar mode the controller 702 directs the symbol mapper 302 to generate symbols according to the GMSK or 8-PSK modulation schemes, which are the modulation schemes used in GSM and EDGE, and when in quadrature mode the controller 702 directs the symbol mapper 302 to generate symbols according to QAM (quadrature amplitude modulation) or OFDM (Orthogonal Frequency-Division Multiplexing), which are the modulation schemes used in WCDMA, HSPA and LTE communications systems. By operating the combination modulator 202 in quadrature mode for WCDMA, HSPA and LTE, bandwidth expansion problems associated with performing modulation in the polar domain are avoided, and by operating the combination modulator 202 in polar mode for GSM and EDGE, energy efficiency is maximized. A similar approach can be used for other types of modulation schemes and other communications systems. Accordingly, the methods and apparatus of the present invention are not limited to Bluetooth or cellular communications applications. Indeed, they may be employed in any type of wireless communications system including, for example, wireless local area networks, wireless metropolitan networks, other types of cellular networks, other types of personal area networks, cordless telephone systems, public service communications systems, and remote control systems. Further, it should also be mentioned that whereas the methods and apparatus of the present invention are well-suited for wireless communications systems, they may also be used in wireline communications systems in which modulated carrier signals are transmitted over wires, cables, fiber optics or other transmission mediums.

In the embodiment of the invention described in reference to FIGS. 7 and 8 above, the controller 702 and other functional elements 700 of the baseband processor 102 are configured so that the combination modulator 202 operates in either polar mode or quadrature mode. In another embodiment of the invention illustrated in FIG. 9, the functional elements of the baseband processor 102 are configured so that the communications transmitter 200 operates in three different operating modes: linear mode, envelope tracking (ET) mode, and switch mode, where here the word "mode" is used to refer more specifically to the operating mode of the final amplifier stage 206 of the multi-stage amplifier 204. In linear mode, the final amplifier stage 206 is configured so that it operates in its linear region of operation (e.g., as a Class A, B of AB amplifier). In switch mode, the final amplifier stage 206 is configured to operate as a switch-mode amplifier (e.g., a Class D or E amplifier). ET mode is an energy efficiency enhancement technique in which the power supply port (e.g., collector or drain of the final amplifier stage 206) is varied. Similar to linear mode, the final amplifier stage 206 is configured to operate as linear amplifier and the low level carrier signal applied to the input of the multi-stage amplifier 204 is a fully modulated waveform containing angle and/or amplitude modulation. However, rather than powering the final amplifier stage 206 by a constant power supply, as is done in linear mode, the baseband processor 102 is configured to generate a time-varying signal A(t), which is used to modulate the power supply of the final amplifier stage 206. Although the final amplifier stage 206 is configured as a linear amplifier, modulating the power supply by the time-varying signal A(t) results in the final amplifier stage 206 operating more efficiently than if the power supply were to be held constant.

Figures 9, 10:
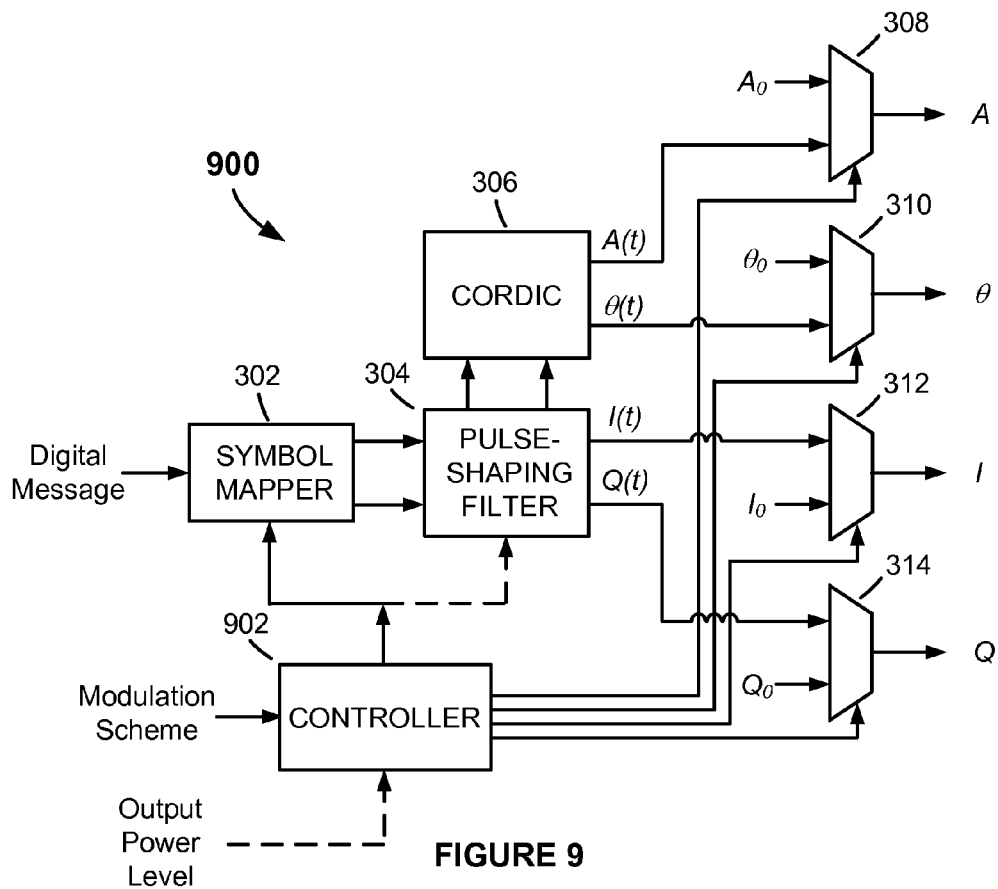
FIG. 9 is a drawing depicting the functional elements of the baseband processor of the communications transmitter in FIG. 2 for an embodiment of the invention in which the communications transmitter is configurable to operate in three different operating modes: linear mode, envelope tracking mode, and switch mode.
FIG. 10 is a table illustrating which operating mode (linear, envelope tracking or switch) the communications transmitter in FIG. 2 is configured to operate and how the output stage amplifier of the transmitter is configured (linear or switch-mode) for an embodiment of the invention in which the communications transmitter is configurable to operate in linear, envelope tracking, and switch modes.

In addition to directing the symbol mapper 302 to generate symbols in accordance with the modulation scheme indicated by the modulation scheme select signal, the controller 902 generates the appropriate select signals for the multiplexers 308, 310, 312 and 314 for the different operating modes, according to the table in FIG. 10. Specifically, for Type I modulation schemes (linear mode of operation), the controller 902 controls the multiplexers 308, 310, 312 and 314 so that the signals at the output of the baseband processor 102 are A=$A_0$, θ=$θ_0$, I=I(t) and Q=Q(t). For Type II modulation schemes (ET mode of operation), the controller 902 controls the multiplexers 308, 310, 312 and 314 so that the signals at the output of the baseband processor 102 are A=A(t), θ=$θ_0$, I=I(t) and Q=Q(t). Hence, when the communications transmitter 200 is operating in linear and ET modes, modulation is performed in the quadrature domain. For Type III modulation schemes (switch mode of operation), the controller 902 controls the multiplexers 308, 310, 312 and 314 so that the signals at the output of the baseband processor 102 are A=A(t), θ(t)=$θ_0$, I=$I_0$, $Q_0$ and modulation is performed in the polar domain. What constitutes Type I, Type II and Type III modulation schemes is established during design, based on modulation-scheme specific signal characteristics such as PMPR, standards requirements, amplifier characteristics and capabilities of the multi-stage amplifier 204, and/or possibly other factors.

For a given modulation scheme the output power level may be used as a factor in determining which of the three operating modes (linear, ET or switch) the communications transmitter 200 is configurable to operate. For example, in one embodiment of the invention in which WCDMA modulating signals are generated, the final amplifier stage 206 is configured so that it transitions between operating in linear and switch modes, depending on the output power level, and in another embodiment in which OFDM signals are generated, the final amplifier stage 206 is configured so that it transitions between linear and ET modes, again depending on the output power level.

Figures 11, 12:
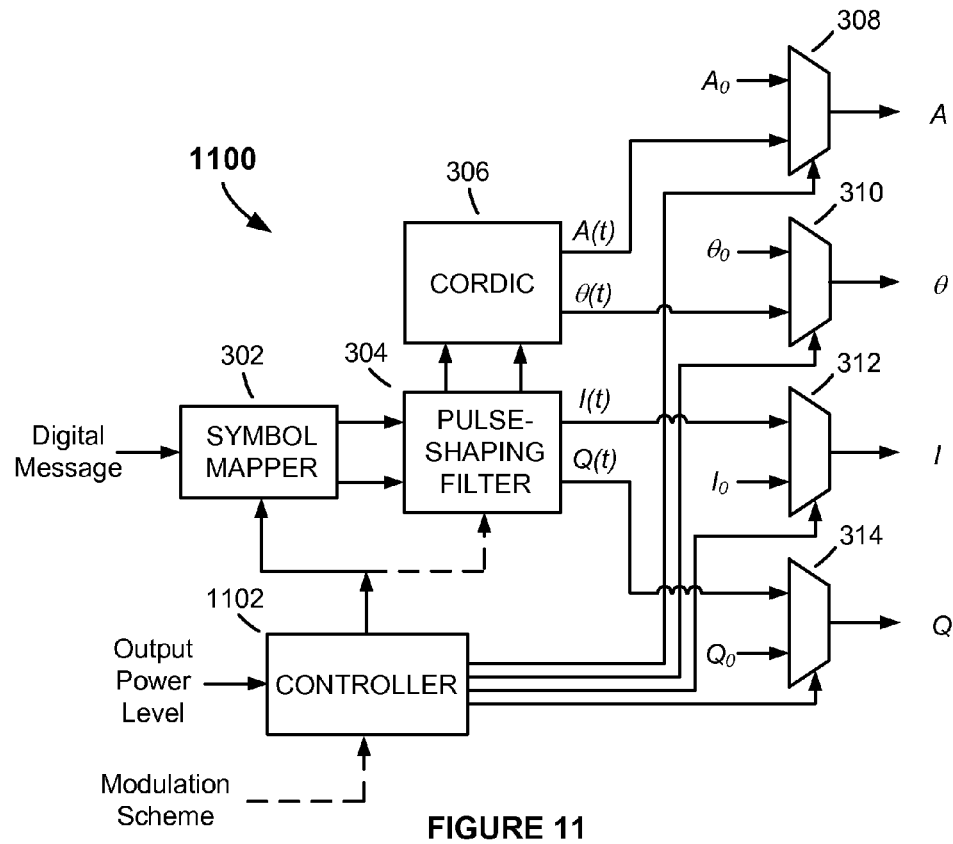
FIG. 11 is a drawing depicting the functional elements of the baseband processor of the communications transmitter in FIG. 2 for another embodiment of the invention in which the communications transmitter is configurable to operate in three different operating modes: linear, envelope tracking, and switch.
FIG. 12 is a table illustrating which mode (linear, envelope tracking or switch) the communications transmitter in FIG. 2 is configured to operate and how the output stage amplifier of the transmitter is configured (linear or switch-mode) for another embodiment of the invention in which the communications transmitter is configurable to operate in linear, envelope tracking, and switch modes.

For some applications and/or modulation schemes it is beneficial to configure the baseband processor 102, combination modulator 202 and multi-stage amplifier 204 so that the output stage amplifier 206 smoothly transitions through all three modes (linear-ET-switch) as the output power level of the transmitter 200 progressively increases from low to medium and medium to high output power levels or progressively decreases from high to medium and medium to low output power levels. According to this embodiment of the invention, the boundaries between the low, medium and high output power level ranges is set during design depending on the capabilities of the amplifiers used in the multi-stage amplifier 204, including the final stage amplifier 206, the signal characteristics of the modulated waveforms applied to the multi-stage amplifier, specifications of a controlling standard, and/or other factors. FIG. 11 is a drawing of the functional elements 1100 of the baseband processor 102 when configured according to this embodiment of the invention. Consistent with the table in FIG. 12, at LOW output power levels during which linear mode is used the controller 1102 controls the multiplexers 308, 310, 312 and 314 so that the signals at the A, θ, I and Q signal outputs of the baseband processor 102 are $A=A_0$, $\theta=\theta_0$, $I=I(t)$ and $Q=Q(t)$. At MEDIUM output power levels during which ET mode is used, the controller 1102 controls the multiplexers 308, 310, 312 and 314 so that the signals at the A, θ, I and Q signal outputs are $A=A(t)$, $\theta=\theta_0$, $I=I(t)$ and $Q=Q(t)$. And, for HIGH output power levels during which switch mode is used, the controller 1102 controls the multiplexers 308, 310, 312 and 314 so that the signals at the A, θ, I and Q signal outputs are $A=A(t)$, $\theta(t)=\theta_0$, $I=I_0$ and $Q=Q_0$. The output stage amplifier 206 of the multi-stage amplifier 204 is configured to operate in its linear region of operation for Type I and II modulation schemes and the combination modulator 202 operates to modulate in the quadrature domain. For Type III modulation schemes, the combination modulator operates to modulate in the polar domain and the output stage amplifier 206 is configured to operate as an energy-efficient switch-mode amplifier.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

What is claimed is:

1. A communications transmitter, comprising:
a baseband processor configured to generate amplitude, angle, in-phase and quadrature signals A, θ, I and Q; and
a combination modulator configured to receive said amplitude, angle, in-phase and quadrature signals A, θ, I and Q, and configurable to modulate a carrier signal in the polar domain using said amplitude and/or angle signals A and θ and in the quadrature domain using said in-phase and/or quadrature signals I and Q,
wherein said baseband processor is configured to generate time-varying in-phase and quadrature modulating signals $I=I(t)$ and $Q=Q(t)$ formatted according to a first modulation scheme while holding the amplitude and angle signals A and θ constant, and said combination modulator is configured to modulate a carrier signal by said time-varying in-phase and quadrature modulating signals I(t) and Q(t) in the quadrature domain.

2. The communications transmitter of claim 1, wherein:
said baseband processor is configured to generate time-varying amplitude and angle modulating signals $A=A(t)$ and $\theta=\theta(t)$ formatted according to a second modulation scheme while holding the in-phase and quadrature signals I and Q constant, and
said combination modulator is configured to modulate a carrier signal by said time-varying amplitude and angle modulating signals A (t) and θ(t) in the polar domain.

3. The communications transmitter of claim 2, wherein said combination modulator comprises:
a quadrature modulator configured to modulate a carrier signal by said time-varying in-phase and quadrature modulating signals I(t) and Q(t), and
an angle modulator configured to modulate a carrier signal by said time-varying angle modulating signal θ(t).

4. The communications transmitter of claim 3, wherein said angle modulator is further configured to serve as a local oscillator for said quadrature modulator during times said quadrature modulator is modulating a carrier signal by said time-varying in-phase and quadrature modulating signals I(t) and Q(t).

5. The communications transmitter of claim 3, further comprising an amplitude modulator configured to modulate a carrier signal by said time-varying amplitude modulating signal $A=A(t)$.

6. The communications transmitter of claim 2, wherein said first and second modulation schemes are modulation schemes used in a communications system controlled by first and second communications standards.

7. A modulation method for a transmitter, comprising:
generating in-phase and quadrature signals;
generating amplitude and angle signals;
controlling whether said in-phase and quadrature signals are constant or are time-varying in-phase and quadrature modulating signals;
controlling whether said amplitude and angle signals are constant or are time-varying amplitude and angle modulating signals;
modulating a carrier signal in the quadrature domain using time-varying in-phase and quadrature modulating signals formatted according to a first modulation scheme while holding the amplitude and angle signals constant; and
modulating a carrier signal in the polar domain using time-varying amplitude and angle modulating signals formatted according to a second modulation scheme while holding the in-phase and quadrature signal constant.

8. The modulation method of claim 7, wherein modulating in the quadrature and polar domains is performed by a combination modulator that includes a quadrature modulator configured to receive said in-phase and quadrature signals, an angle modulator that in addition to performing angle modulation serves as a local oscillator for said quadrature modulator, and an amplitude modulator configured to receive said amplitude signal.

9. The modulation method of claim 7, wherein the in-phase, quadrature, amplitude and angle signals are continuously applied to the combination modulator during times when the combination modulator is modulating in either the quadrature domain or the polar domain.

10. The modulation method of claim 7, wherein three or more of said in-phase, quadrature, amplitude and angle signals applied to the combination modulator are time-varying modulating signals and said combination modulator is configured to modulate in both the quadrature and polar domains at the same time.

11. An apparatus for a communications transmitter, comprising:
   means for generating time-varying amplitude, angle, in-phase and quadrature signals A(t) θ(t), I(t) and Q(t);
   means for producing output amplitude, angle, in-phase and quadrature output signals A, θ, I and Q, each which is configurable to be set to be a time-varying amplitude, angle, in-phase, quadrature signal A(t), θ(t), I(t), Q(t) or a time-invariant signal $A_0$, $θ_0$, $I_0$, $Q_0$;
   means for setting said output amplitude and angle signals A and θ to be time-varying amplitude and angle signals A(t) and θ(t) while maintaining said output in-phase and quadrature signals I and Q as time-invariant signals $I_0$ and $Q_0$; and
   means for setting said output in-phase and quadrature signals I and Q to be time-varying in-phase and quadrature signals I(t) and Q(t) while maintaining said output amplitude and angle signals A and θ as time-invariant signals $A_0$ and $θ_0$.

12. The apparatus of claim 11, wherein said output amplitude and angle signals A and θ are set to be time-varying amplitude and angle signals A(t) and θ(t) and said output in-phase and quadrature signals I and Q are set to be time-invariant signals $I_0$ and $Q_0$ during times said means for generating is configured to operate according to a first modulation scheme, and said output in-phase and quadrature signals I and Q are set to be time-varying in-phase and quadrature signals I(t) and Q(t) and said output amplitude and angle signals A and θ are set to be time-invariant signals $A_0$ and $θ_0$ during times said means for generating is configured to operate according to a second modulation scheme.

13. The apparatus of claim 11, wherein said output amplitude and angle signals A and θ are set to be time-varying amplitude and angle signals A(t) and θ(t) and said output in-phase and quadrature signals I and Q are set to be time-invariant signals $I_0$ and $Q_0$ during times a transmitter in which the apparatus is employed is configured to transmit at a first output power level, and said output in-phase and quadrature signals I and Q are set to be time-varying in-phase and quadrature signals I(t) and Q(t) and said output amplitude and angle signals A and θ are set to be time-invariant signals $A_0$ and $θ_0$ during time said transmitter is configured to transmit at a second output power level.

14. The apparatus of claim 11, further comprising means for modulating a carrier signal according to said amplitude, angle, in-phase and quadrature signals A, θ, I and Q.

15. The apparatus of claim 14, wherein said means for modulating is configured to modulate in the quadrature domain during times a transmitter in which the apparatus is employed is configured to transmit at a first output power level and said output in-phase and quadrature signals I and Q are set as time-varying in-phase and quadrature signals I(t) and Q(t) and said output amplitude and angle signals A and θ are set as time-invariant signals $A_0$ and $θ_0$.

16. The apparatus of claim 15, wherein said means for modulating is configured to modulate in the polar domain during times said transmitter is configured to transmit at a second output power level higher than said first output power level and said output amplitude and angle signals A and θ are set as time-varying amplitude and angle signals A(t) and θ(t) and said output in-phase and quadrature signals I and Q are set as time-invariant signals $I_0$ and $Q_0$.

17. A combination modulator for a communications transmitter, comprising:
   a quadrature modulator configurable to modulate a carrier signal in the quadrature domain by a first modulating signal conforming to a first modulation scheme; and
   an angle modulator, separate and distinct from said quadrature modulator, coupled to said quadrature modulator and configurable to modulate a carrier signal in the polar domain by a second modulating signal conforming to a second modulation scheme,
   wherein said first modulating signal has a peak-to-minimum dynamic range greater than the peak-to-minimum dynamic range of said second modulating signal.

18. A communications transmitter, comprising:
   a baseband processor configured to generate amplitude, angle, in-phase and quadrature signals A, θ, I and Q; and
   a combination modulator configured to receive said amplitude, angle, in-phase and quadrature signals A, θ, I and Q, and configurable to modulate a carrier signal in the polar domain using said amplitude and/or angle signals A and θ and in the quadrature domain using said in-phase and/or quadrature signals I and Q,
   wherein said combination modulator is configured to modulate a carrier signal in the polar domain during times said baseband processor is configured to operate according to a first modulation scheme, and is configured to modulate a carrier signal in the quadrature domain during times said baseband processor is configured to operate according to a second modulation scheme.

19. A communications transmitter, comprising:
   a baseband processor configured to generate amplitude, angle, in-phase and quadrature signals A, θ, I and Q; and
   a combination modulator configured to receive said amplitude, angle, in-phase and quadrature signals A, θ, I and Q, and configurable to modulate a carrier signal in the polar domain using said amplitude and/or angle signals A and θ and in the quadrature domain using said in-phase and/or quadrature signals I and Q,
   wherein said combination modulator is configured to modulate a carrier signal in the polar domain during times the communications transmitter is configured to transmit at a first output power level, and is configured to or modulate a carrier signal in the quadrature domain during times the communications transmitter is configured to transmit at a second output power level.

20. A communications transmitter, comprising:
   a baseband processor configured to generate amplitude, angle, in-phase and quadrature signals A, θ, I and Q; and
   a combination modulator configured to receive said amplitude, angle, in-phase and quadrature signals A, θ, I and Q, and configurable to modulate a carrier signal in the polar domain using said amplitude and/or angle signals A and θ and in the quadrature domain using said in-phase and/or quadrature signals I and Q,
   wherein whether said combination modulator is configured to modulate a carrier signal in the quadrature domain or modulate a carrier signal in the polar domain is dependent upon the peak-to-minimum dynamic range of a modulating generated by said baseband processor.

* * * * *